United States Patent [19]
Stenudd

[11] 3,920,958
[45] Nov. 18, 1975

[54] OPTICAL READER FOR PERFORATED CODE CARRIER TAPE

[75] Inventor: Sven Gunnar Valter Stenudd, Lidingo, Sweden

[73] Assignee: Facit Aktiebolag, Atvidaberg, Sweden

[22] Filed: Apr. 1, 1974

[21] Appl. No.: 456,801

[30] Foreign Application Priority Data

Apr. 2, 1973 Sweden ........................... 73045841

[52] U.S. Cl. ........................... 235/61.11 E; 250/555
[51] Int. Cl.[2] ........................ G06K 7/10; G08C 9/06
[58] Field of Search ....... 235/61.11 E; 250/255, 266

[56] References Cited

UNITED STATES PATENTS 2,620,978 12/1952 Carroll et al. ................ 235/61.11 E
3,360,635 12/1967 Wolf et al. .................. 235/61.11 E
3,476,918 11/1969 Howell ......................... 235/61.11 E
3,655,945 4/1972 Bowen et al. ................ 235/61.11 E

*Primary Examiner*—Daryl W. Cook
*Attorney, Agent, or Firm*—Alfred E. Miller

[57] ABSTRACT

An optical reader in which a light source irradiates a movable code carrier tape. A light reading is detected by means of photosensitive members located on the side of the tape remote from the light source and at a distance greater than the distance between the light source and the code carrier. The light source has a small range and a high intensity and the photosensitive members are positioned at the far end of channels through which the light beams in the proper aligned positions of perforated carrier tape and an underlying perforated plate create a greater contrast between the intensities of the light present in the channels.

9 Claims, 4 Drawing Figures

OPTICAL READER FOR PERFORATED CODE CARRIER TAPE

BACKGROUND OF THE INVENTION

In photoelectric punched tape readers of the known type it is difficult to get the proper contrast ratio. In this regard, the difference between the various light intensities are not readily recognizable by the photosensitive members as light and dark respectively. It is important that the greatest possible contrast in light intensities be detected for various reasons. One important reason is that punched paper tapes vary in translucence between 30% and 70%. Furthermore, if the paper tapes are oil stained, the tapes may be translucent in the order of 80%. Another reason for achieving greater contrast between light and dark with respect to optical readers is that individual photosensitive detecting members, such as photosemiconductors, can vary considerably with respect to each other. A further reason for securing greater contrast, as mentioned above, is that the semiconductor components of the apparatus, for example, phototransistors and light emitting diodes, are temperature-sensitive to varying degrees with respect to the individual components.

SUMMARY OF THE INVENTION

It is an object of the present invention to provide an optical reader of a perforated code carrier tape in which considerably greater contrast between light and dark is obtained than in previously known optical readers.

Another object of the present invention is to provide a plurality of photo-sensitive members located on the side of the tape remote from the light source and at a greater distance from the tape than the distance of the light source to the tape. The channels for the conduction of the light beam to the respective photosensitive members are arranged in the shape of a fan so that the photosensitive members form a comparatively long arc having a light source at its center, said light source, for example, being a light-emitting diode. Since the photosensitive members are spaced along a long arc a large light-receiving area can be utilized thereby materially increasing the sensitivity of these members.

Another object of the present invention is to provide a small range light source which will emit diverging radiation only but with great intensity.

The invention will now be more fully described with reference to the accompanying drawings in which.

DESCRIPTION OF THE PREFERRED EMBODIMENT OF THE INVENTION

Figure 1:
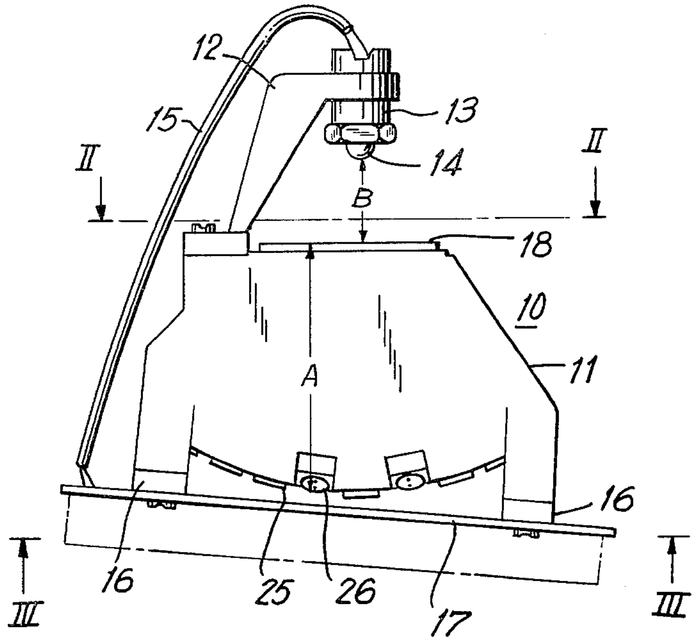
FIG. 1 is a side elevational view of an optical reader for perforated code carrier tape constructed in accordance with the teachings of the present invention.
Figure 2:
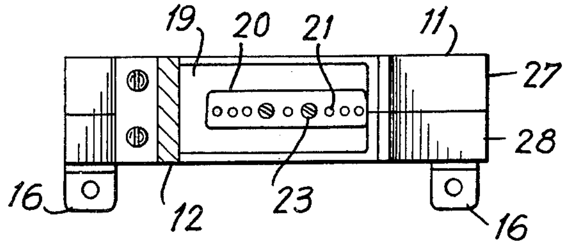
FIG. 2 is a top plan view, partly in section, of the apparatus shown in FIG. 1.
Figure 3:
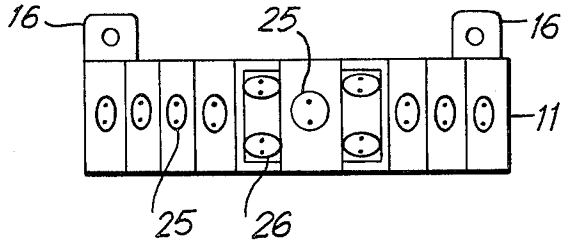
FIG. 3 is a bottom plan view of the apparatus shown in FIG. 1.

Referring to FIG. 1, a reading head is shown referred to generally by the numeral 10 having a block housing 11 constituted of two substantially identical parts 27 and 28. The housing 11 is provided on a top surface thereof with a cantilever arm 12. A socket 13 is secured to the free end of the cantilever arm 12 for removable attachment of a light-emitting diode 14. The conductor 15 supplies electric current to the diode 14 from a power supply (not shown). As seen in FIG. 1–3, the reading head 10 is adapted to be secured to a support 17 for a punched tape reader device (not shown) by means of attachment flanges 16.

Figure 4:
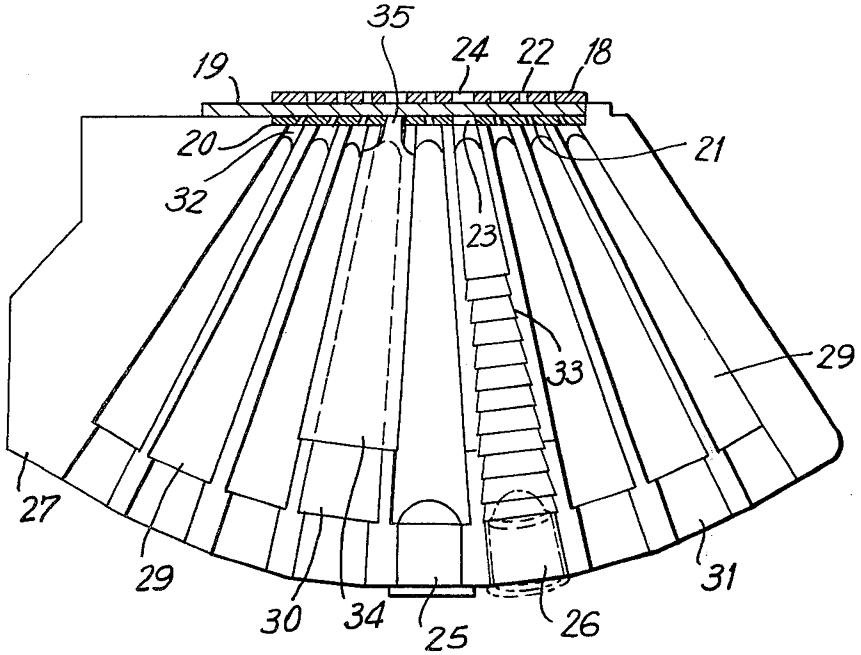
FIG. 4 is an elevational view, partly in section, and on an enlarged scale, of one of two identical parts of the apparatus.

As seen in FIG. 1, and particularly in FIG. 4 a punched tape 18 is moved across the table-like support of the block housing 11 of the reading head 10. During the reading process the tape 18 moves over the translucent plate 19 which, for example, may be glass or plastic. As seen in FIG. 4, a perforated plate 20 is located underneath the translucent plate 19. The perforated plate 20 is provided with holes 21 which correspond to the code-carrying holes 22 of the punched tape 18. The perforated plate 20 further has holes 23 which correspond to the guide holes 24 in the tape 18.

Photosensitive members, for example phototransistors 25, are mounted in the bottom part of the block housing 11 and function to sense the light passing from the light emitting diode 14 through the holes in the punched tape 18 and the corresponding aligned holes in the perforated plate 20. In this connection, the phototransistors 25 correspond and detect light projecting through holes 22 in the punched tape 18 while pairs of phototransistors 26 correspond and detect light projecting through the guide holes 24 in the punched tape.

FIG. 2 shows the housing block 11 being constituted of two substantially identical parts 27 and 28 and one of the parts 28 is shown on an enlarged scale in FIG. 4 having a plurality of grooves 29. The part 28 is shown provided with phototransistors 25 located in the grooves 29 while the pairs of phototransistors 26 are positioned in the grooves 30. When the parts 27 and 28 are assembled as illustrated in FIG. 2 channels are formed through which light can pass to the phototransistors in the block 11. As seen in FIG. 4 the outer ends or bottom of the channels are shaped in a manner whereby the phototransistors may be readily secured thereto. It should be noted that the channels narrow from the larger bottom end 31 toward the inner or upper ends 32 which open adjacent to the respective holes 21 and 23 in the perforated plate 20.

Referring again to FIG. 4, it will be observed that the channels are fan-shape in arrangement so that the phototransistors will be located at the bottom of housing 11 but along an arc. The arc that has been formed has at its center the light emitting diode 14. Accordingly, the light beam emanating from the diode 14 can project through a hole in the punched tape 18 and a corresponding hole in the perforated plate 20, and further through a corresponding channel to a phototransistor located at the end thereof. If there is no hole in the punched tape directly under the diode 14 and above one of the holes in the perforated plate 20, a portion of the light projecting from the diode 14 will penetrate the punched tape 18 and spread in a pattern as in the case of an omnidirectional radiating surface. Because of the divergence of light beams from the light emitting diode 14 and the additional divergence imparted to the beams after passage through the punched tape 18, only an insignificant portion of the light will fall on the photosensitive surface of the phototransistor. This result is especially the case in the present construction in which the phototransistor is positioned at a relatively long distance from the punched tape 18.

As seen in FIG. 4, the interior walls of grooves or channels 30 are provided with a series of inclined consecutive surfaces 33 forming stepped indemtations in the walls in order to avoid the reflection of light from the walls of the channels. The inclined surfaces 33 are so constructed to prevent unwanted light from reaching the phototransistors.

Referring to FIG. 4, when a guide hole 24 located in the punched tape 18 passes over a corresponding hole 23 in the perforated plate 20, light from one half of the guide hole 24 will fall on and be detected by one phototransistor 26 of the pair, while light from the other half of the guide hole 24 will fall on and be detected by the other phototransistor 26 of the pair. In order to accomplish this result, and as seen in FIGS. 2 and 4, the grooves 30 are provided with longitudinal partitions 34, each having a tab 35 that extends into a hole 23 and divides the hole 23, as seen in FIG. 2, into two parts or separate channels.

A study of FIG. 1 reveals that the distance A between the phototransistors 25 and 26 and the punched tape 18 is approximately twice the distance B between the light emitting diode 14 and tape 18.

The above described construction has resulted in an improvement in optical readers whereby a good ratio of contrast has been achieved that is not present in known devices of this type. Moreover, the normally occuring variations in the data utilized with the present device can be disregarded and, furthermore, the device is considerably less sensitive to strong incident light than is the case in known devices of this type.

What I claim is:

1. An optical reading device for a perforated code carrier tape comprising a housing, a high intensity light source located on one side of the tape, a plurality of photosensitive members positioned on the other side of the tape, said tape being movable with respect to said light source whereby light beams from the light source pass through the perforations in said code carrier tape when the latter is in the proper aligned position, a plurality of elongated channels in said housing, each of said channels being formed of two substantially identical parts in which each is provided with a longitudinal groove so that the elongated channels are formed by the opposed grooves upon the joining of said identical parts, and a photosensitive member at one end of each of said channels, the other end of each elongated channel being located in the proximity of at least one of the positions in which a perforation in the code carrier tape may assume upon movement of said tape.

2. The device as claimed in claim 1 wherein said photosensitive members are located at a distance from the code carrier tape which is approximately double the distance between said light source and the tape.

3. The device as claimed in claim 1 wherein said channels are arranged in a fan shape, said photosensitive members in said channels being disposed along an arc, the center line of which passes through said light source.

4. The device as claimed in claim 1 further comprising a cantilever arm, and said light source being supported at the free end of said arm substantially centered over said housing.

5. The device as claimed in claim 1 wherein each of said elongated channels has a small opening at one end adjacent to said code carrier tape, said opening corresponding in size to predetermined holes in said tape; the opening at the other end of each of said channels being relatively larger.

6. The device as claimed in claim 1 wherein said photosensitive members are phototransistors.

7. The device as claimed in claim 1 further comprising a translucent plate and a perforated plate; the latter having holes which correspond to the holes in said code carrier tape; said tape, translucent plate and perforated plate being arranged in a superposed manner.

8. The device as claimed in claim 1 wherein the interior walls of said channels are provided with stepped indentations in order to prevent the reflected light present in the channels from reaching said photosensitive members.

9. The device as claimed in claim 1 in which each of said photo-sensitive members is positioned at a distance from the tape which is greater than the distance between the light source and said tape.

* * * * *